S. A. D. RILEY.
SWATHER FOR MOWING MACHINES.
APPLICATION FILED MAR. 8, 1906.

930,617.

Patented Aug. 10, 1909.

Witnesses:
Chester H. Roake
J. Townsend.

Inventor
Stephen A.D. Riley.
by James R. Townsend
his atty

UNITED STATES PATENT OFFICE.

STEPHEN A. D. RILEY, OF COVINA, CALIFORNIA, ASSIGNOR OF ONE-FOURTH TO WARREN E. LLOYD, OF LOS ANGELES, CALIFORNIA.

SWATHER FOR MOWING-MACHINES.

No. 930,617.  Specification of Letters Patent.  Patented Aug. 10, 1909.

Application filed March 8, 1906. Serial No. 304,890.

*To all whom it may concern:*

Be it known that I, STEPHEN A. D. RILEY, a citizen of the United States, residing at Covina, in the county of Los Angeles and State of California, have invented a new and useful Swather for Mowing-Machines, of which the following is a specification.

An object of the invention is to provide improved means for laying the swath of hay or grain cut by a mowing machine out of the way of the standing hay or grain, so that the same will be out of the way of the knife on the succeeding round of the mowing machine.

The invention relates to that class which comprises the combination with a sickle-bar of a finger extending in front of the sickle bar at or near its outer extremity and provided with a fender extending rearwardly and inwardly from the front of the finger.

The invention consists in improvements in a device for parting the standing grain or grass in front of the sickle-bar, bending the grain or grass to be cut away from that to be left standing, causing it to fall away from the standing grass or grain and thereby preventing it from being cut into a second time on the succeeding round of the machine.

The object of this invention is to provide a superior device for separating the grain or grass before it is cut and to avoid all liability of interference with fallen or tangled grass, the same being so constructed as to hold and bend the grain or grass at time of being cut, so that it will fall away from the standing grain or grass and will be guided and laid a distance therefrom, so as to leave a space between the cut and standing grain or grass.

Figure 1:
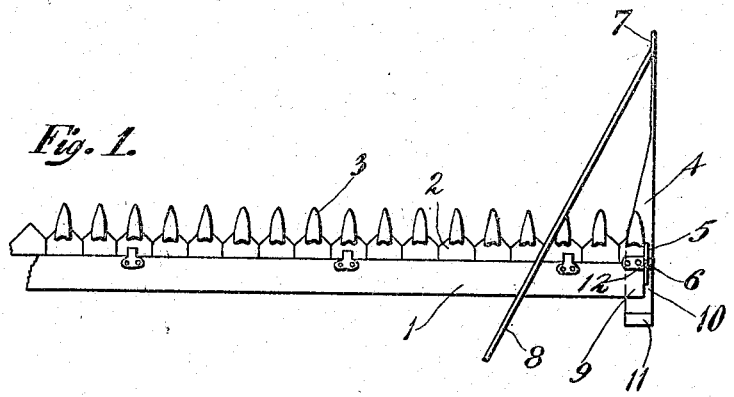
Figure 2:
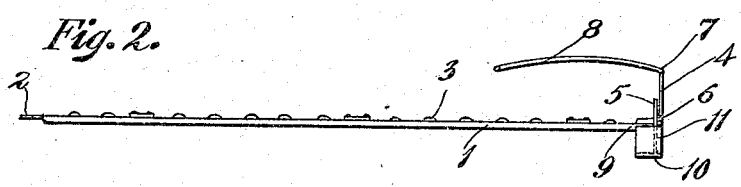
Figure 4:
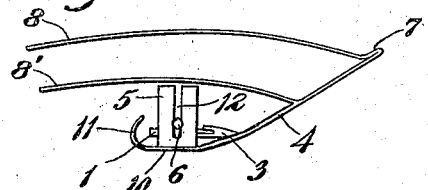
Figure 3:
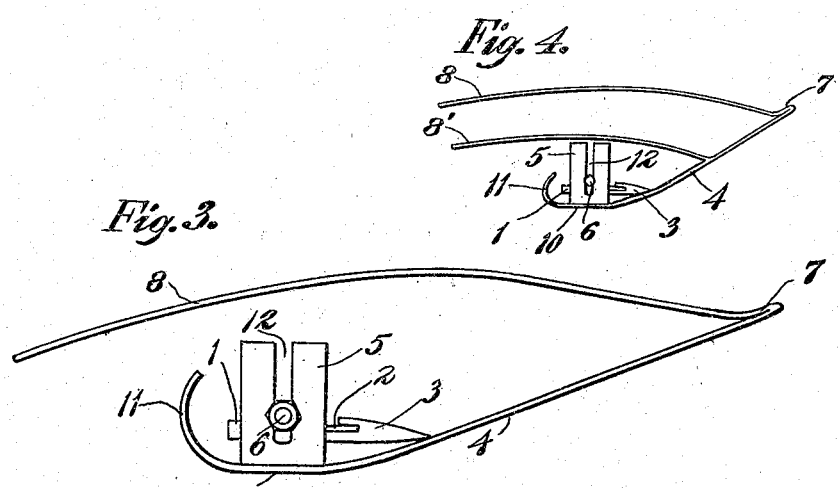

The accompanying drawings illustrate the invention:

Figure 1 is a fragmental plan view showing the invention ready for operation. Fig. 2 is a view from the rear of the device shown in Fig. 1. Fig. 3 is an elevation from the right of Figs. 1 and 2. Fig. 4 is a side elevation of the device constructed with two rods projecting back to form the fender.

1 designates the sickle-bar of a mowing machine; 2, the cutter knives; 3, the guards. These parts are all constructed in the usual manner.

4 designates a finger attached to the sickle-bar by a standard 5 and a bolt 6, and projecting forwardly from said sickle-bar and terminating in a point 7 at the front end, and provided with a fender 8 extending rearwardly from the forward end of the finger 4, and sloping rearwardly, and extending obliquely across the sickle-bar away from the outer end 9 thereof, so that as the mower moves forward the finger 7 will part the standing grain or grass before the cutters of the sickle-bar reach the same, so that when the grass or grain is cut by the cutters 2 of the sickle-bar the same will fall away from the standing grass or grain, leaving a bare space alongside the standing grain in the path over which the finger 4 and fender 8 have passed. The rear portion of the finger 4 is flattened to form a shoe 10 curving upwardly at its rear end 11 to avoid catching on obstructions or running into the ground when the end of the sickle-bar is moved backward. The finger may be constructed to be attached to any machine.

12 designates a vertical slot in the standard 5 through which the bolt 6 passes, thus allowing adjustment of the shoe 10 up and down to correspond to the elevation desired for the sickle-bar above the ground.

The finger 4 may be formed of a rod projecting forwardly and upwardly and bent into a V-shape, and provided at the rear with a shoe having a flat portion to rest on the ground, as shown; from which shoe the rod extends aslant upward and forward to the point of the V and thence rearward and sidewise aslant from a vertical plane that extends axially of the shoe.

The shoe may be made of steel or any other substance that will wear well, and the finger and fender may be made of metal rod or other device. It is preferably made of steel rod.

In practical use as the sickle-bar moves forward, the point of the device separates the standing grain to be cut from that which is to be left uncut and bends the same toward the path through which the sickle-bar is about to pass and holds the grass or grain in the bent position until it comes above the sickle-bar and is cut, whereupon the cut grass or grain will fall away from the grass or grain that is left standing, thus leaving a clear space between the cut grass or grain and that which is left standing.

In the form shown in Fig. 4, two rods 8, 8′, are provided to form the fender. This form may be found desirable where the grain or grass to be cut varies in length; one rod 8' being arranged below the level of the other to bend the shorter grain or grass, and the upper rod 8 being designed to bend the taller grass.

What I claim is:

1. A swather for mowing machines comprising the finger 4, the standard 5 formed integral with the finger and having a vertical slot 12, said finger projecting forwardly from the standard and terminating in a point 7, the fender 8 extending rearwardly from the point 7 and inwardly, said finger 4 being flattened at its rear end to form the shoe 10 having the upwardly-curved rear end 11.

2. A swather for mowing machines comprising the combination with a sickle-bar having guards 3, of the finger 4 projecting forwardly from the sickle-bar and terminating in the point 7, the fender 8 extending rearwardly and inwardly over the sickle-bar, the rear portion of the finger being flattened to form the shoe 10 under the end of the sickle-bar and having the upwardly-curved rear end 11, the standard 5 secured to the shoe-part and having a vertical slot and the bolt 6 inserted in the slot to secure the swather to the sickle-bar.

3. A swather for mowing machines comprising the combination with the sickle-bar having the guards 3, of the finger 4 projecting forwardly and terminating in the point 7, the fender 8 extending rearwardly from the point 7 and inwardly over the sickle-bar, the fender 8' extending rearwardly from an intermediate point on the finger and inwardly over the sickle-bar, the rear portion of the finger 4 being flattened to form the shoe 10 having the upwardly-curved rear end 11, the standard 5 formed integrally with the shoe and having the vertical slot and the bolt 6 seated in the sickle-bar and adjustably mounted in the slot to secure the swather in place.

In testimony whereof, I have hereunto set my hand at Los Angeles, California this 27th day of February 1906.

S. A. D. RILEY.

In presence of—
   JAMES R. TOWNSEND,
   JULIA TOWNSEND.